US007231219B2

(12) United States Patent
Curtis et al.

(10) Patent No.: US 7,231,219 B2
(45) Date of Patent: Jun. 12, 2007

(54) METHOD, APPARATUS, AND PROGRAM FOR AUTOMATED PROPERTY ADJUSTMENT IN A CELLULAR NETWORK

(75) Inventors: Bryce Allen Curtis, Round Rock, TX (US); Jimmy Ming-Der Hsu, Austin, TX (US); Marc-Arthur Pierre-Louis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 10/322,057

(22) Filed: Dec. 17, 2002

(65) Prior Publication Data

US 2004/0203899 A1    Oct. 14, 2004

(51) Int. Cl.
*H04Q 7/20* (2006.01)
(52) U.S. Cl. .............................. 455/456.4; 455/422.1; 455/456.1
(58) Field of Classification Search ............. 455/456.4, 455/456.1, 457, 417, 567, 422.1, 411, 450, 455/434, 435.1, 414.1
See application file for complete search history.

(56) References Cited

U.S. PATENT DOCUMENTS

| 5,442,805 | A   |   | 8/1995  | Sagers et al. ............ 455/33.1 |
|-----------|-----|---|---------|-------------------------------------|
| 6,011,973 | A   | * | 1/2000  | Valentine et al. ........ 455/456.6 |
| 6,049,700 | A   |   | 4/2000  | Hardouin .................... 455/69 |
| 6,052,577 | A   | * | 4/2000  | Taguchi ..................... 455/411 |
| 6,122,486 | A   | * | 9/2000  | Tanaka et al. .............. 455/68  |
| 6,131,045 | A   | * | 10/2000 | Iwata ....................... 340/7.39 |
| 6,151,493 | A   | * | 11/2000 | Sasakura et al. ........... 455/421  |
| 6,198,938 | B1  |   | 3/2001  | Chavez, Jr. ................ 455/519 |
| 6,343,213 | B1  | * | 1/2002  | Steer et al. ................ 455/411 |
| 6,389,288 | B1  |   | 5/2002  | Kuwahara et al. ......... 455/456   |
| 6,393,254 | B1  | * | 5/2002  | Pousada Carballo et al. ... 455/1   |
| 6,456,822 | B1  | * | 9/2002  | Gofman et al. ............... 455/1  |
| 6,625,455 | B1  | * | 9/2003  | Ariga ...................... 455/456.1 |
| 6,687,506 | B1  | * | 2/2004  | Girod ...................... 455/456.4 |
| 6,907,254 | B1  | * | 6/2005  | Westfield ................. 455/456.4 |
| 2001/0049275 | A1 |  | 12/2001 | Pierry et al.                       |
| 2003/0008644 | A1 | * | 1/2003  | Akhterzzaman et al. .... 455/418    |

FOREIGN PATENT DOCUMENTS

| EP | 0 876 070 A1 | 11/1998 |
| JP | 11-041644    | 2/1999  |
| JP | 2000-253456  | 9/2000  |
| JP | 2001-339761  | 12/2001 |
| KR | 2001090626   | 10/2001 |
| WO | WO 01/20945  | 3/2001  |

\* cited by examiner

*Primary Examiner*—Sonny Trinh
(74) *Attorney, Agent, or Firm*—Duke W. Yee; Jeffrey S. LaBaw; James O. Skarsten

(57) ABSTRACT

A mechanism is provided for detecting when a wireless device is entering a quiet zone. An out-of-range condition is created in an entryway to a quiet zone. When a wireless device is in a transition zone, the device transmits a re-scan message with a unit identification in an attempt to reestablish communication with the communication tower. A re-scan receiver is provided in the entryway to receive re-scan messages and notify a mobile telephone switching office that the device is entering a quiet zone. The switching office then sends a ring type modifier property to the device when the device leaves the transition zone and reestablishes communications with the communication tower.

21 Claims, 5 Drawing Sheets

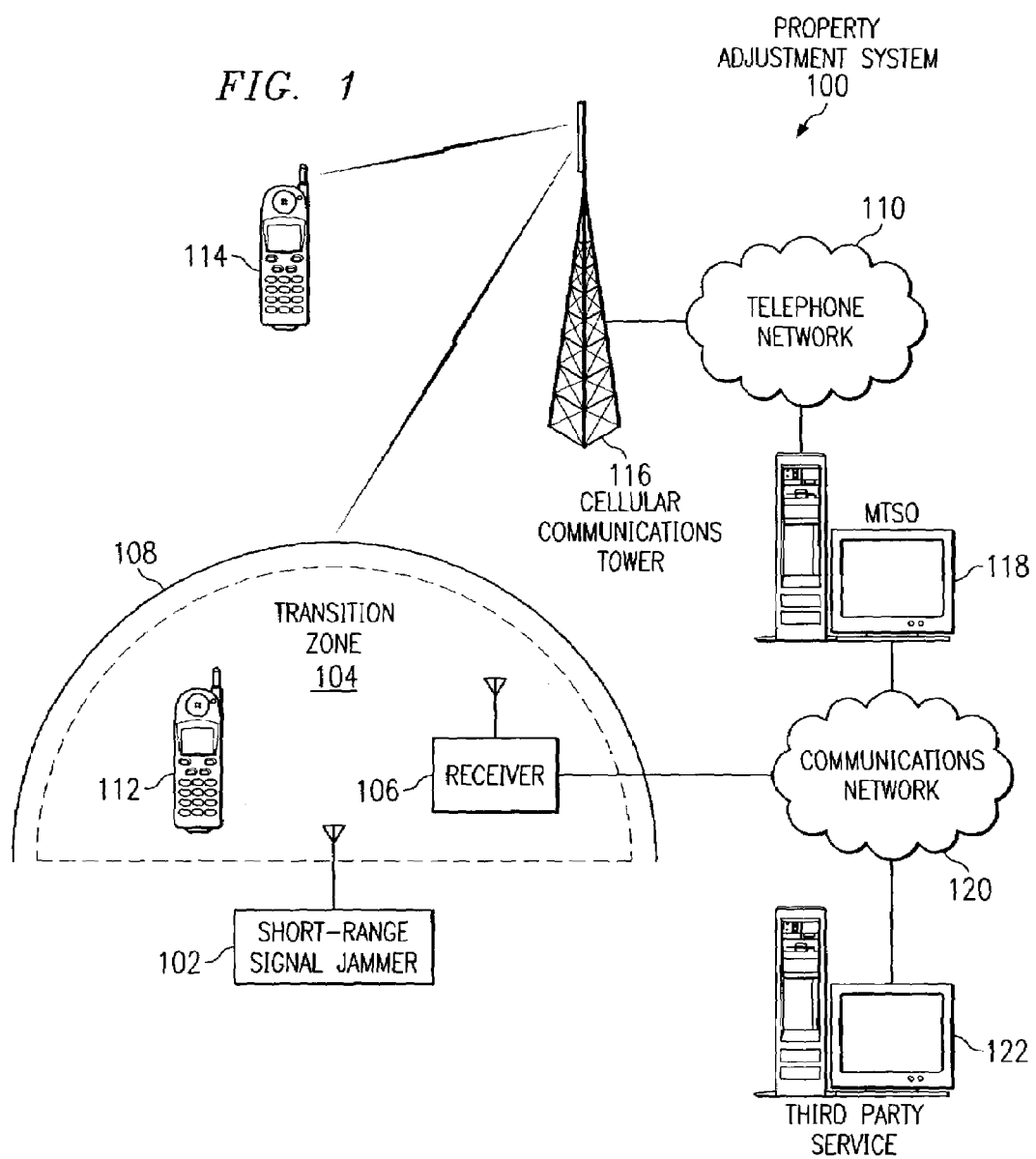

METHOD, APPARATUS, AND PROGRAM FOR AUTOMATED PROPERTY ADJUSTMENT IN A CELLULAR NETWORK

BACKGROUND OF THE INVENTION

1. Technical Field

The present invention relates to wireless devices and, in particular, to wireless devices in a cellular network. Still more particularly, the present invention provides a method, apparatus, and program for adjusting properties of a wireless device in a cellular network.

2. Description of Related Art

Wireless devices, and in particular cellular telephones, can be an intrusion in certain situations. More specifically, there are many situations or locations in which an audible ring is inappropriate. For example, an audible wireless telephone ring may be quite a distraction during a wedding, a movie, a concert, a lecture, or a conference.

Typically, an individual would turn the telephone off or switch the ring to a silent mode, such as a vibrating ring. However, this method is flawed because the individual may easily forget to turn off or silence the wireless telephone.

Therefore, it would be advantageous to provide a mechanism for automatically change the properties of a wireless device when entering a quiet zone.

SUMMARY OF THE INVENTION

The present invention provides a mechanism for detecting when a wireless device is entering a quiet zone. An out-of-range condition is created in an entryway to a quiet zone. This condition may be created by shielding the entryway to prevent the wireless device from communicating with the cellular communication tower. Alternatively, a short-range signal jammer may be provided in the entryway or a combination of a shielded entryway with a short-range signal jammer may be used. When the wireless device is in the transition zone, the device transmits a re-scan message with a unit identification in an attempt to reestablish communication with the communication tower. A re-scan receiver is provided in the entryway to receive re-scan messages and notify a mobile telephone switching office that the device is entering a quiet zone. The switching office then sends a ring type modifier property to the device when the device leaves the transition zone and reestablishes communications with the communication tower. The ring type modifier may set the wireless device into a silent mode, such as a vibrating ringer. Alternatively, the wireless device may be setup to forward calls to voice mail. A quiet mode time-out duration may be set as the user enters quiet zones that have multiple exits allowing a user to leave the zone without passing a re-scan receiver.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a property adjustment system in a cellular network in accordance with a preferred embodiment of the present invention;

DETAILED DESCRIPTION OF THE PREFERRED EMBODIMENT

Figure 2A:
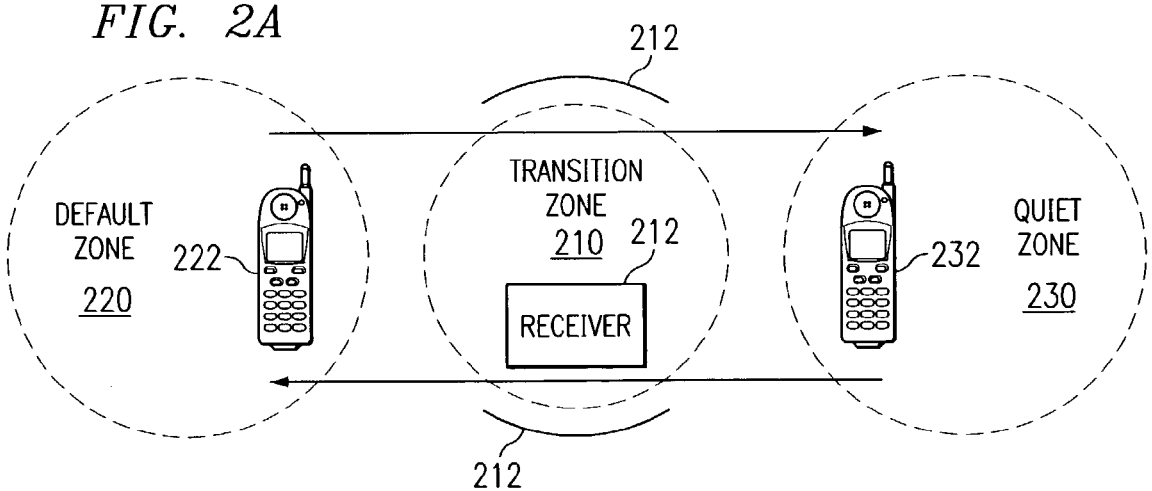
FIGS. 2A and 2B are diagrams depicting wireless devices traversing zones in accordance with a preferred embodiment of the present invention.

With reference now to the figures, FIG. 1 depicts a pictorial representation of a property adjustment system in a cellular network in accordance with a preferred embodiment of the present invention. Property adjustment system 100 is a network of devices in which the present invention may be implemented. Property adjustment system 100 contains telephone network 110 and communications network 120, which are the media used to provide communications links between various devices and computers connected together within property adjustment system 100. Telephone network 110 and communications network 120 may include connections, such as wire, wireless communication links, or fiber optic cables.

In the depicted example, telephone network 110 is connected to cellular communications tower 116. The cellular communications tower communicates with wireless devices, such as wireless telephones 112, 114. Transition zone 104 is formed using a signal weakening mechanism, such as shielding 108, short-range signal jammer 102, or a combination of the two. As shown in FIG. 1, wireless device 112 is within the transition zone. Therefore, the signal between wireless device 112 and cellular communications tower 116 may be weakened or blocked by the signal weakening mechanism. When wireless device 112 is in the transition zone, the device re-scans channels by transmitting a re-scan message with a unit identification (ID) in an attempt to reestablish communication with the communication tower.

In a preferred embodiment of the present invention, the signal is weakened to the point that the device will attempt a re-scan to find a channel with a stronger signal. However, if a person is carrying on a conversation, the signal may be sufficient to maintain the conversation. The short-range signal jammer may also weaken all channels except for the channels to which the re-scan device listens.

Re-scan receiver 106 is provided in the entryway to receive re-scan messages. Receiver 106 then notifies mobile telephone switching office (MTSO) computer 118 that the device is entering a quiet zone. The receiver may accomplish this notification by sending a zone change message including the unit ID, a zone ID, and/or one or more predefined properties for the zone. In this example, the receiver initiates a quiet mode for the device. The next time wireless telephone 112 establishes communication with tower 116, the MTSO may modify the properties of the device. For example, the MTSO may send a ring type modifier (RTM) message to the wireless device. Preferably, the properties may be adjusted the next time a call comes for the wireless device. In other words, an RTM message may be sent with each call, the RTM depending upon the zone properties.

Receiver 106 may communicate with the MTSO through a communications network, such as network 120. Alternatively, the receiver may communicate with the MTSO computer by other means, such as through a dial-up connection (not shown). The receiver may communicate with a plurality of MTSOs for different wireless communications companies. However, in a preferred embodiment of the present invention, the receiver sends a zone change message to a central third-party service 122, which has handles communication of zone change messages to various MTSOs. For example, third-party service computer 122 may receive zone change messages via network 120 or by other means, such as direct dial-up connections (not shown). Similarly, third-party service 122 may forward zone change messages to various MTSOs via network 120 or by other means.

The wireless device is programmed to receive an RTM message and adjust properties accordingly. For example, wireless telephone 112 may receive an RTM message that modifies the ring to "vibrate" mode. In response to this message, the wireless device will set the ring properties for all calls to "vibrate." Therefore, the user may receive calls without disturbing neighboring people.

As stated above, the RTM is preferably set on a call-by-call basis. Therefore, if an emergency call is received at the MTSO, the MTSO may adjust the ring type to an audible ring for the emergency call to ensure that the user receives the call. If the wireless device is not capable of adjusting properties responsive to an RTM message, the MTSO may route all calls to the user's voice mail while the device is in a quiet zone.

When a user leaves a quiet zone, the user may exit through the same entryway or transition zone. Thus, when wireless telephone 112 enters transition zone 104 at the end of an event, such as a conference or movie, receiver 106 may be programmed to send a zone change message to MTSO to return the device to a set of default properties. The receiver may be programmed to send the appropriate zone change message by a switch or the like. Alternatively, the receiver may be programmed by a remote device through, for example, communications network 120.

A quiet mode time-out duration may be set in the MTSO as the user enters a quiet zone. Therefore, if the user leaves the quiet zone without passing the re-scan receiver, the MTSO may return the device to the default properties when the time-out duration expires.

Property adjustment system 100 may include additional servers, clients, and other devices not shown. In the depicted example, property adjustment system 100 is implemented within the Internet with network 120 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, property adjustment system 100 also may be implemented using a number of different types of networks, such as for example, an intranet, a local area network (LAN), or a wide area network (WAN). FIG. 1 is intended as an example, and not as an architectural limitation for the present invention.

Figure 2B:
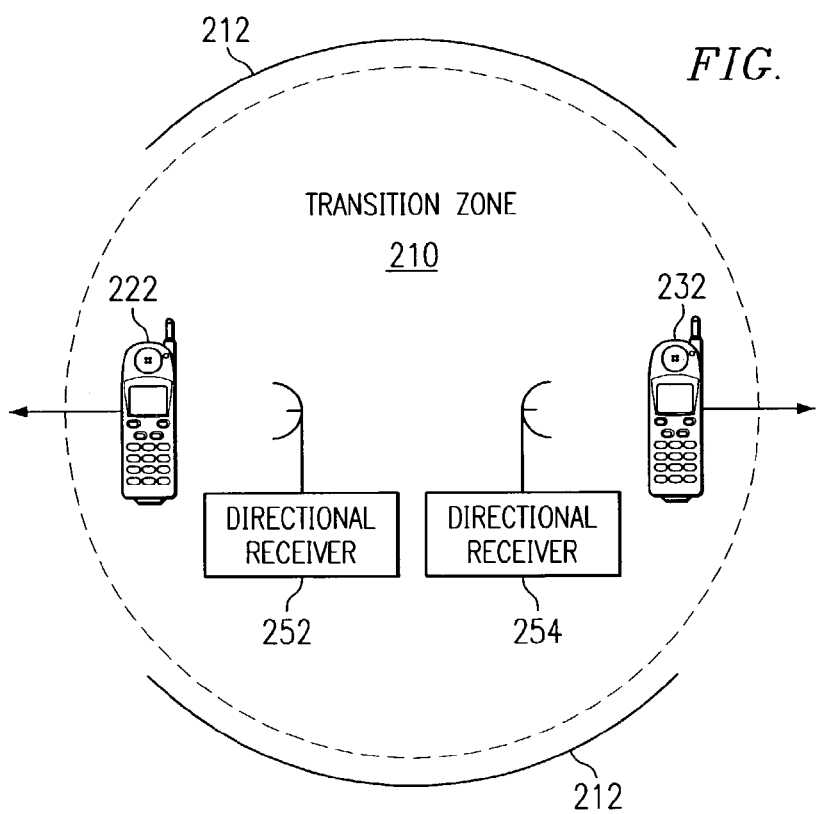

With reference now to FIGS. 2A and 2B, diagrams depicting wireless devices traversing zones are shown in accordance with a preferred embodiment of the present invention. In FIG. 2A, wireless device 232 travels from default zone 220, through transition zone 210, to quiet zone 230. Transition zone 210 is established by signal weakening mechanism 212, which may be, for example, a shielded entryway, a signal jammer, or a combination of the two. Wireless device 222 travels from quiet zone 230, through transition zone 210, to default zone 220.

Receiver 214 receives re-scan messages from wireless devices. However, as shown in FIG. 2A, wireless devices may be traveling in either direction. If the owner of a wireless device enters the transition zone from the default zone, turns around, and exits back into the default zone, the receiver may still send a zone change message to the MTSO.

FIG. 2B shows a transition zone with two directional receivers, re-scan receiver 252 and re-scan receiver 254. Re-scan receiver 252 receives re-scan messages as wireless device 222 exits transition zone 210 into the default zone. Re-scan receiver 254 receives re-scan messages as wireless device 232 exits transition zone 210 into the quiet zone.

The MTSO may receive zone change messages from each receiver as a wireless device passes each receiver. The MTSO may then process the later of the two zone change messages. Alternatively, directional receivers 252, 254 may be connected to a controller that coordinates the re-scan messages and sends the appropriate zone change message to the MTSO. Thus, if re-scan messages for a device are received by receiver 252 and then receiver 254, controller 256 may determine that the wireless device is entering the quiet zone. On the other hand, if re-scan messages are received by receiver 254 and then receiver 252, controller 256 may determine that the wireless device is entering the default zone.

Figure 3A:
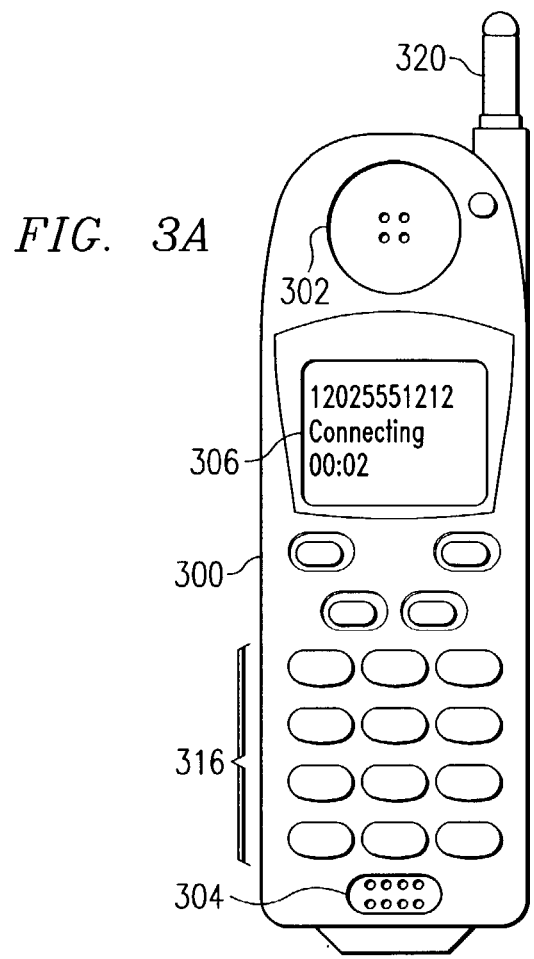
FIGS. 3A and 3B illustrate a wireless telephone device that may be used in a preferred embodiment of the present invention.
Figure 3B:
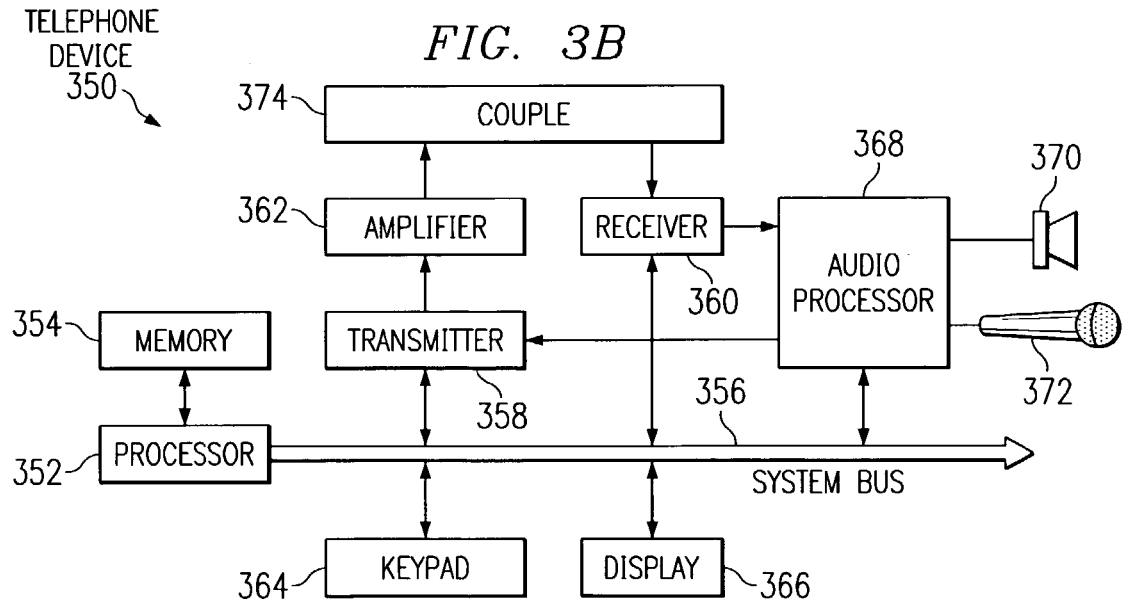

FIGS. 3A and 3B illustrate a wireless telephone device that may be used in a preferred embodiment of the present invention. Turning now to FIG. 3A, a wireless telephone device 300 is shown in accordance with a preferred embodiment of the present invention. Wireless telephone 300 includes speaker 302, microphone 304, display 306, and keypad 316. Wireless telephone 300 also includes antenna 320 for communication with the nearest base station. Wireless telephone 300 may include other features common to mobile telephones, such as function buttons, cursor control buttons, scroll wheels, and caller ID.

With reference now to FIG. 3B, a block diagram of a hardware configuration of a telephone device is depicted in accordance with a preferred embodiment of the present invention. Telephone device 350 includes a processor 352 for controlling operation of the telephone device and a memory 354. The processor may be a general-purpose microprocessor operating under the control of instructions stored a memory, such as memory 354, or device-specific circuitry for controlling the operation of the telephone device. Processor 352 is connected by system bus 356 to transmitter 358, receiver 360, keypad 364, display 366, and audio processor 368. Keypad 364 may be keypad 318 in FIG. 3A. Display 366 may be display 306 in FIG. 3A. Display 366 may be a liquid crystal display (LCD) or other known display, such as an active matrix display.

Transmitter 358 and receiver 360 are coupled to a telephone signal by couple 374 to provide full duplex communication. In a preferred embodiment of the present invention, the telephone signal is provided by an antenna, such as antenna 320 in FIG. 3A, in a wireless telephone. Audio processing circuit 368 provides basic analog audio outputs to speaker 370 and accepts analog audio inputs from microphone 372. Received signals are demodulated and decoded by receiver 360. Transmitter 358 encodes and modulates signals passed to it by processor 352 or audio processor 368. The output of the transmitter is amplified by power amplifier 362 to control the power level at which the signal is transmitted.

Processor 352 is programmed to send a re-scan when a signal from a communications tower or base station is lost. Processor 352 is also programmed to receive a RTM message and adjust ring type or other properties in accordance with the RTM message. As stated above, a RTM message may be received when a communication session with a tower or base station is reestablished or when a call is received.

Those of ordinary skill in the art will appreciate that the hardware depicted in FIGS. 3A and 3B may vary. For example, telephone device 300 may include a vibrating mechanism to generate a vibration pattern as a ring. Telephone device 350 may also be configured to communicate other information, such as World Wide Web content, and display such content on display 366. The telephone device may also provide other functions, such as calender/scheduling, word processing, e-mail, and games.

Figure 4:
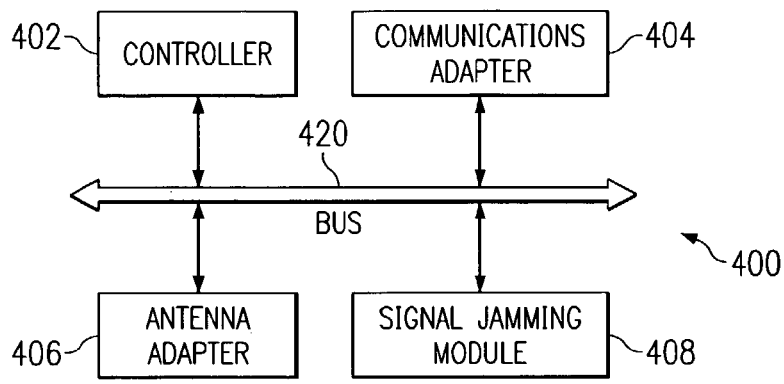
FIG. 4 is an exemplary block diagram of a signal jammer in accordance with a preferred embodiment of the present invention.

FIG. 4 is an exemplary block diagram of a signal jammer in accordance with a preferred embodiment of the present invention. Signal jammer 400 includes controller 402, communications adapter 404, antenna adapter 406, and signal jamming module 408. The elements 402–408 may be implemented as hardware, software, or a combination of hardware and software. In a preferred embodiment, the elements 404–408 are implemented as software instructions executed by one or more processors.

The elements 402–408 are coupled to one another via the control/data signal bus 420. Although a bus architecture is shown in FIG. 4, the present invention is not limited to such. Rather, any architecture that facilitates the communication of control/data signals between elements 402–408 may be used without departing from the spirit and scope of the present invention. The controller 402 controls the overall operation of the signal jammer and orchestrates the operation of the other elements 404–408.

With the operation of the present invention, signal jamming module 408 instructs controller 402 to transmit a signal via antenna adapter 406 to disrupt or jam communications between wireless devices and their respective cellular communications towers and/or base stations. Controller 402 may also operate under the control of another device by receiving instructions or messages through communications adapter 404, which may be, for example, a network adapter, a modem, a serial port, or the like.

Figure 5:
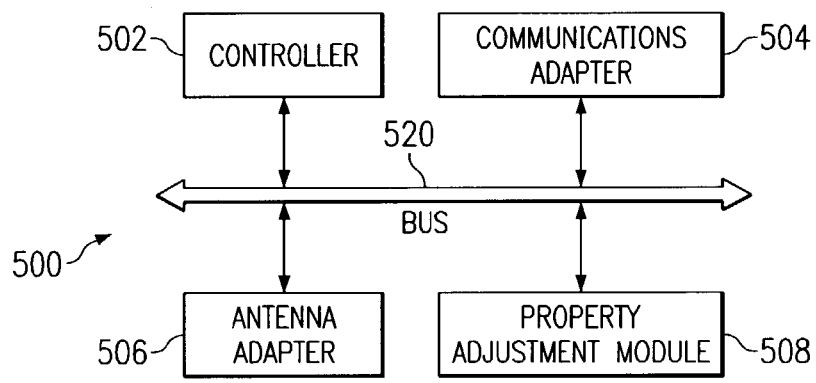
FIG. 5 is an exemplary block diagram of a re-scan receiver in accordance with a preferred embodiment of the present invention.

FIG. 5 is an exemplary block diagram of a re-scan receiver in accordance with a preferred embodiment of the present invention. Re-scan receiver 500 includes controller 502, communications adapter 504, antenna adapter 506, and property adjustment module 508. The elements 502–508 may be implemented as hardware, software, or a combination of hardware and software. In a preferred embodiment, the elements 504–508 are implemented as software instructions executed by one or more processors.

The elements 502–508 are coupled to one another via the control/data signal bus 520. Although a bus architecture is shown in FIG. 5, the present invention is not limited to such. Rather, any architecture that facilitates the communication of control/data signals between elements 502–508 may be used without departing from the spirit and scope of the present invention. The controller 502 controls the overall operation of the re-scan receiver and orchestrates the operation of the other elements 504–508.

With the operation of the present invention, property adjustment module 508 instructs controller 502 to detect re-scan signals or messages via antenna adapter 506 and to generate a zone change message for a wireless device identified in the re-scan message. Property adjustment module 508 then instructs controller 502 to send the re-scan message to an MTSO or third-party service via communications adapter 504, which may be, for example, a network adapter, a modem, a serial port, or the like.

Controller 502 may also operate under the control of another device by receiving instructions or messages through communications adapter 504. For example, the re-scan receiver may be instructed to generate zone change messages for a quiet zone before an event and then for a default zone at the end of the event. Zone properties may be set by an external device through communications adapter 504.

Figure 6:
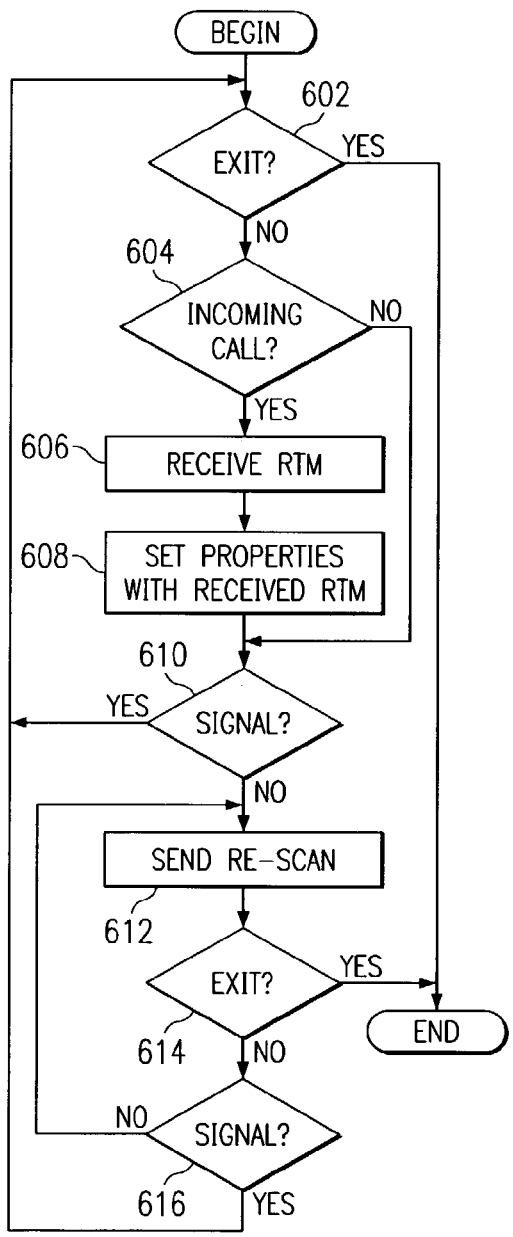
FIG. 6 is a flowchart of the operation of a wireless device in accordance with a preferred embodiment of the present invention.

With reference to FIG. 6, a flowchart of the operation of a wireless device is illustrated in accordance with a preferred embodiment of the present invention. The process begins and a determination is made as to whether an exit condition exists (step 602). An exit condition may exist, for example, if the wireless device is powered down. If an exit condition exists, the process ends.

If an exit condition does not exist in step 602, a determination is made as to whether an incoming call is received (step 604). If an incoming call is received, the process receives a ring type modifier message (step 606) and sets the properties in accordance with the ring type modifier message (step 608). Next, a determination is made as to whether a signal is established between the wireless device and a communications tower or base station (step 610). If an incoming call is not received in step 604, the process proceeds to step 610 to determine whether a signal is established between the wireless device and a communications tower or base station.

A separate ring type modifier message may be associated with each individual call. Therefore, an emergency call may be associated with a ring type modifier message that sets the ring type to an audible ring. Thus, steps 606 and 608 may be performed for each call received while in a quiet zone. In an alternative embodiment, the ring type modifier message may be received in step 606 when the wireless device reestablishes a signal with the tower or base station.

If a signal is established in step 610, the process returns to step 602 to determine whether an exit condition exists. If the signal is lost in step 610, the process sends a re-scan message (step 612) in an attempt to reestablish communication with the tower or base station.

Next, a determination is made as to whether an exit condition exists (step 614). If an exit condition exists, the process ends. If, however, an exit condition does not exist in step 614, a determination is made as to whether a signal is established between the wireless device and a communications tower or base station (step 616). If a signal is not yet reestablished, the process returns to step 612 to send a re-scan message in an attempt to reestablish communication with the tower or base station. If a signal is reestablished in step 616, the process returns to step 602 to determine whether an exit condition exists.

Figure 7:
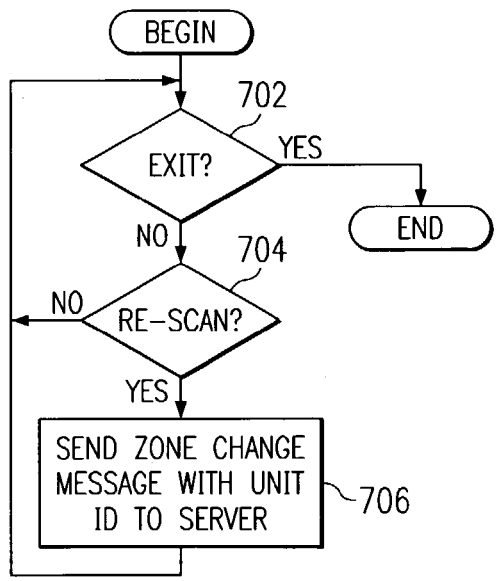
FIG. 7 is a flowchart of the operation of a re-scan receiver in accordance with a preferred embodiment of the present invention.

With reference now to FIG. 7, a flowchart of the operation of a re-scan receiver is illustrated in accordance with a preferred embodiment of the present invention. The process begins and a determination is made as to whether an exit condition exists (step 702). An exit condition may exist, for example, if the re-scan receiver is powered down. If an exit condition exists, the process ends.

If an exit condition does not exist in step 702, a determination is made as to whether a re-scan message is received (step 704). If a re-scan message is received, the process sends a zone change message, with a unit ID from the re-scan message, to a server, such as the mobile telephone switching office server or a server associated with a third-party service (step 706). Thereafter, the process returns to step 702 to determine whether an exit condition exists. If a re-scan message is not received in step 704, the process returns to step 702 to determine whether an exit condition exists.

Figure 8:
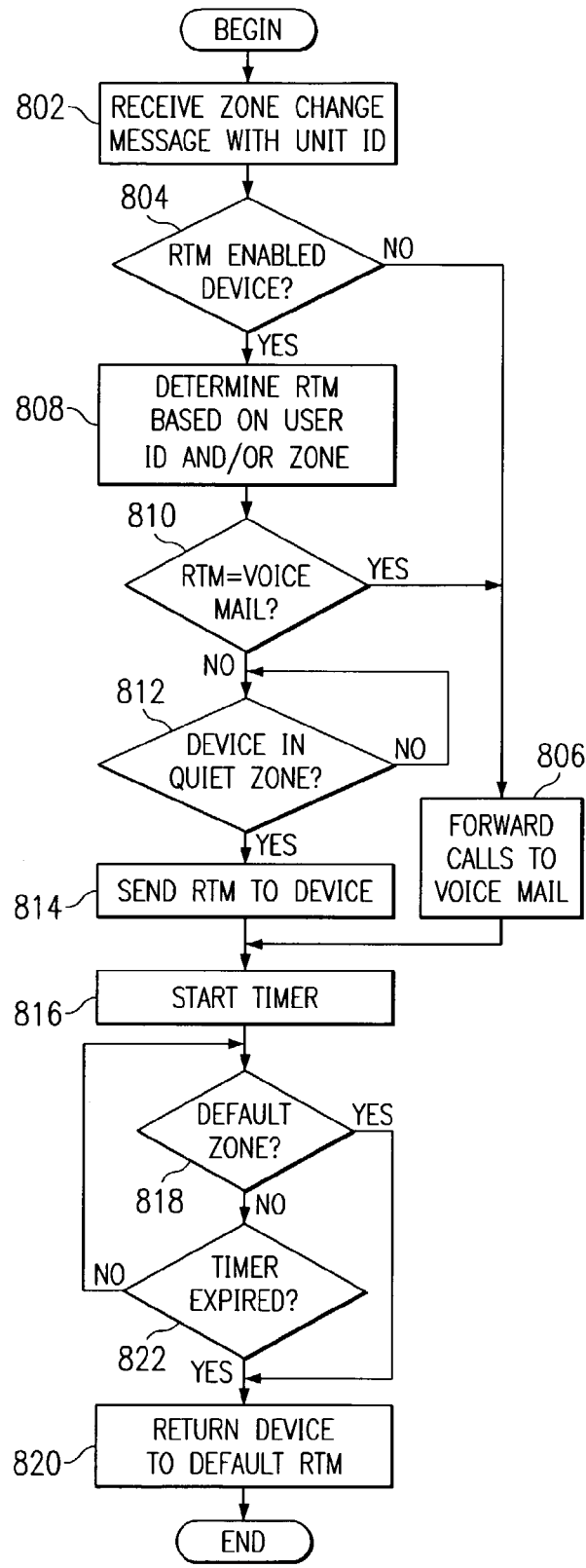
FIG. 8 is a flowchart illustrating the operation of a mobile telephone switching office in accordance with a preferred embodiment of the present invention.

Turning now to FIG. 8, a flowchart illustrating the operation of a mobile telephone switching office is shown in accordance with a preferred embodiment of the present invention. The process begins and receives a zone change message with a unit ID (step 802). A determination is made as to whether the wireless device associated with the unit ID is enabled for ring type modifiers (step 804).

If the wireless device is not RTM enabled, the process begins forwarding calls for the device to voice mail (step 806). If the wireless device is RTM enabled in step 804, the process determines a ring type modifier based on the user ID and/or the zone the device is entering (step 808). A determination is made as to whether the RTM is set to forward calls to voice mail (step 810).

Certain zones may be configured such that the RTM is set to voice mail for the zone. For example, an employer may wish to ensure that all employees attending a conference or meeting pay attention rather than answering telephone calls, even if the ring type is set to "vibrate" mode. In such a case the receiver in the entryway may be programmed to send a zone change message that indicates that the RTM should be set to voice mail.

If the RTM is set to forward calls to voice mail, the operation proceeds to step 806 to forward calls to voice mail. If the RTM is not set to forward calls to voice mail in step 810, a determination is made as to whether the device is in the quiet zone (step 812). In other words, the process determines whether the device has left the shielded entryway and reestablished communications with the communications tower or base station.

If the device is not yet in the quiet zone, the process returns to step 812 to repeat this determination. If, however, the device has entered the quiet zone, the process sends an RTM message to the device (step 812). The RTM message may be sent when the wireless device reestablishes a signal with the tower or base station. Alternatively, the ring type modifier message may be associated with an individual call. Therefore, an emergency call may be associated with a ring type modifier message that sets the ring type to an audible ring. Thus, step 814 may be performed for each call received while in a quiet zone.

After the process has begun forwarding calls to voice mail in step 806 or the RTM message is sent to the wireless device in step 814, the process starts a timer (step 816). If the device leaves the quiet zone without passing a re-scan receiver, the process may return the device to the default properties when the time-out duration expires.

Next, a determination is made as to whether the device enters a default zone (step 818). This may be determined by a subsequent zone change message from the re-scan receiver or by receiving a zone change message from a directional re-scan receiver that indicates the device is leaving a quiet zone and entering a default zone. If the process determines that the device has entered a default zone, the process returns the device to the default ring type with a RTM message (step 820). Then, the process ends.

If the process determines that the device has not entered a default zone in step 818, a determination is made as to whether the timer is expired (step 822). If the timer is not expired, the process returns to step 818 to determine whether the device has entered a default zone. If, however, the timer is expired in step 822, operation proceeds to step 820 to return the device to the default ring type and the process ends.

Thus, the present invention solves the disadvantages of the prior art by providing a mechanism for automatically adjusting the properties of a wireless device as the device enters a predetermined quiet zone. An entryway is configured to block the signal to the wireless device, thus creating a transition zone within the entryway. Responsive to a re-scan message, a receiver within the transition zone sends a zone change message to a mobile telephone switching office. The mobile telephone switching office may then adjust a ring type modifier or other property for the wireless device when communications with the device are reestablished.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for adjusting properties of a wireless device, comprising:

responsive to a wireless device entering a controlled area, causing the wireless device to emit a re-scan signal;

identifying a device identifier from the re-scan signal;

sending a zone change message including the device identifier to a computer, wherein the zone change message indicates that the wireless device is entering a zone;

establishing communication with unrestricted power between the wireless device in the zone and a location outside the zone; and adjusting the ring type of the wireless device in accordance with a requirement corresponding to the zone.

2. The method of claim 1, wherein the zone change message includes a zone identifier.

3. The method of claim 1, wherein the zone change message includes a property for the zone.

4. The method of claim 3, wherein the property is a ring type.

5. The method of claim 1, wherein the computer is located at one of a mobile telephone switching office and a third-party service.

6. A method for adjusting a property of a wireless device, comprising:
 responsive to a wireless device entering a controlled area causing the wireless device to emit a re-scan signal, receiving a zone change message including a device identifier;
 determining a property for the wireless device based on the zone change message;
 sending to the wireless device a property modifier for changing the property of the device; and
 establishing unrestricted communication between the wireless device in the controlled area and a location outside the controlled area.

7. The method of claim 6, wherein the zone change message includes a zone identifier and wherein the step of determining a property includes determining the property based on the zone identifier.

8. The method of claim 6, wherein the zone change message includes a property for the zone.

9. The method of claim 6, wherein the step of sending to the device a property modifier includes:
 receiving a call for the wireless device;
 determining a property modifier for the call;
 associating the property modifier with the call; and
 directing the call to wireless device.

10. A re-scan receiver, in a controlled area, for adjusting properties of a wireless device, comprising:
 means for receiving a re-scan signal from a wireless device responsive to the wireless device emitting the re-scan signal when entering the controlled area;
 means for identifying a device identifier from the re-scan signal;
 means for sending a zone change message including the device identifier to a computer, wherein the zone change message indicates that the wireless device is entering a zone; and
 means for establishing unrestricted communication between the wireless device in the zone area and a location outside the zone.

11. The re-scan receiver of claim 10, wherein the zone change message includes a zone identifier.

12. The re-scan receiver of claim 10, wherein the zone change message includes a property for the zone.

13. The re-scan receiver of claim 12, wherein the property is a ring type.

14. An apparatus for adjusting a property of a wireless device, comprising:
 receipt means, responsive to a wireless device entering a controlled area causing the wireless device to emit a re-scan signal, for receiving a zone change message including a device identifier, wherein the receipt means comprises a first directional re-scan receiver that receives re-scan signals from a first direction, and a second directional re-scan receiver that receives re-scan signals from a second direction;
 determination means for determining a property for the wireless device based on the zone change message; and
 sending means for sending to the wireless device a property modifier for changing the property of the wireless device.

15. The apparatus of claim 14, wherein the zone change message includes a zone identifier and wherein the determination means includes means for determining the property based on the zone identifier.

16. The apparatus of claim 14, wherein the zone change message includes a property for the zone.

17. The apparatus of claim 14, wherein the sending means includes:
 means for receiving a call for the wireless device;
 means for determining a property modifier for the call;
 means for associating the property modifier with the call; and
 means for directing the call to wireless device.

18. A property adjustment system, comprising:
 a signal weakening mechanism, wherein the signal weakening mechanism weakens cellular communications signals in a transition zone, causing a wireless device to emit a re-scan signal;
 a re-scan receiver located in the transition zone, wherein the re-scan receiver sends a zone change message in response to receiving the re-scan signal, wherein the re-scan receiver is a first directional re-scan receiver that receives re-scan signals from a first direction, and the property adjustment system further comprises a second directional re-scan receiver that receives re-scan signals from a second direction, and wherein the zone change message includes a device identifier; and
 a computer, wherein the computer sends a property modifier to the wireless device responsive to receiving the zone change message.

19. The property adjustment system of claim 18, wherein the signal weakening mechanism is one of shielding and a short-range signal jammer.

20. The property adjustment system of claim 18, wherein the computer is located at one of a mobile telephone switching office and a third-party service.

21. A computer program product encoded in a computer readable medium, for adjusting a property of a wireless device, comprising:
 instructions for receiving a zone change message including a device identifier, responsive to a wireless device entering a controlled area causing the wireless device to emit a re-scan signal;
 instructions for determining a property for the wireless device based on the zone change message;
 instructions for sending to the wireless device a property modifier for changing the property of the wireless device; and
 instructions for establishing unrestricted communication between the wireless device in the controlled area and a location outside the controlled area.

* * * * *